United States Patent
Sato et al.

(10) Patent No.: US 11,795,272 B2
(45) Date of Patent: Oct. 24, 2023

(54) METHOD FOR PRODUCING POLYARYLENE SULFIDE

(71) Applicant: Kureha Corporation, Tokyo (JP)

(72) Inventors: Takeshi Sato, Tokyo (JP); Yoshinori Suzuki, Tokyo (JP)

(73) Assignee: Kureha Corporation, Tokyo (JP)

( * ) Notice: Subject to any disclaimer, the term of this patent is extended or adjusted under 35 U.S.C. 154(b) by 0 days.

(21) Appl. No.: 17/906,583

(22) PCT Filed: Nov. 25, 2020

(86) PCT No.: PCT/JP2020/043898
§ 371 (c)(1),
(2) Date: Sep. 16, 2022

(87) PCT Pub. No.: WO2021/192413
PCT Pub. Date: Sep. 30, 2021

(65) Prior Publication Data
US 2023/0126671 A1   Apr. 27, 2023

(30) Foreign Application Priority Data
Mar. 24, 2020 (JP) .................................. 2020-052798

(51) Int. Cl.
*C08G 75/0213* (2016.01)
*C08G 75/0254* (2016.01)
*C08G 75/0281* (2016.01)

(52) U.S. Cl.
CPC ..... *C08G 75/0213* (2013.01); *C08G 75/0254* (2013.01); *C08G 75/0281* (2013.01)

(58) Field of Classification Search
CPC .............. C08G 75/14; C08G 75/0263; C08G 75/0268; C08G 75/0259; C08G 75/025; B30B 9/28
See application file for complete search history.

(56) References Cited

U.S. PATENT DOCUMENTS

| 4,038,260 A | 7/1977 | Campbell |
| 4,663,431 A | 5/1987 | Fujii et al. |
| 9,422,400 B2 | 8/2016 | Konno et al. |
| 9,422,402 B2 | 8/2016 | Suzuki et al. |
| 10,731,005 B2 | 8/2020 | Konno et al. |
| 2015/0065664 A1* | 3/2015 | Konno .................. C08G 75/14 525/537 |
| 2016/0068636 A1 | 3/2016 | Suzuki et al. |
| 2017/0029570 A1* | 2/2017 | Kobayashi ......... C08G 75/0209 |
| 2017/0107329 A1* | 4/2017 | Konno ............... C08G 75/0259 |
| 2017/0137573 A1 | 5/2017 | Suzuki et al. |
| 2017/0145168 A1* | 5/2017 | Enomoto .................... C08J 3/07 |
| 2018/0171078 A1 | 6/2018 | Kimura et al. |
| 2018/0340043 A1 | 11/2018 | Konno et al. |
| 2019/0055358 A1 | 2/2019 | Konno et al. |
| 2020/0024402 A1 | 1/2020 | Konno et al. |

FOREIGN PATENT DOCUMENTS

| CN | 106062039 A | 10/2016 |
| CN | 106164133 A | 11/2016 |
| CN | 107075117 A | 8/2017 |
| CN | 107636045 A | 1/2018 |
| CN | 108602954 A | 9/2018 |
| CN | 110121521 A | 8/2019 |
| JP | 61-264024 A | 11/1986 |
| JP | 62-190228 A | 8/1987 |
| JP | 7-33877 A | 2/1995 |
| JP | 2003-176357 A | 6/2003 |
| JP | 2016-056232 A | 4/2016 |
| JP | 6062924 B2 | 1/2017 |
| JP | 2017-179255 A | 10/2017 |

OTHER PUBLICATIONS

Office Action for JP Application No. 2022-509251, dated Nov. 1, 2022, 2 pages.
English translation of Office Action for JP Application No. 2022-509251, dated Nov. 1, 2022, 4 pages.
Office Action for CN Application No. 202080097487.3, dated Nov. 30, 2022, 6 pages.
English translation of Office Action for CN Application No. 202080097487.3, dated Nov. 30, 2022, 4 pages.

* cited by examiner

*Primary Examiner* — Shane Fang
(74) *Attorney, Agent, or Firm* — Abel Schillinger, LLP

(57) ABSTRACT

A method for producing PAS having an average particle size of 50 μm or greater and 550 μm or less is provided. The method can include: (1) a preparation step of preparing a prepared mixture containing an organic polar solvent, a sulfur source, and a dihalo aromatic compound; (2) a pre-stage polymerization step of initiating a polymerization reaction by heating the prepared mixture to produce a prepolymer; (3) a phase separation step of adding water as a phase separation agent to a reaction mixture in a reaction system to form a phase separation state; and (4) a post-stage polymerization step of continuing the polymerization reaction after the phase separation step, in which an organic sulfonic acid metal salt having a specific solubility in water is contained in the prepared mixture or the reaction mixture.

5 Claims, No Drawings

METHOD FOR PRODUCING POLYARYLENE SULFIDE

TECHNICAL FIELD

The present invention relates to a method for producing a polyarylene sulfide.

BACKGROUND ART

A polyarylene sulfide (hereinafter, also referred to as "PAS"), represented by polyphenylene sulfide (hereinafter, also referred to as "PPS"), is an engineering plastic having excellent heat resistance, chemical resistance, flame retardancy, mechanical strength, electrical characteristics, dimensional stability, and the like. PAS can be formed into various molded products, films, sheets, fibers, and the like by ordinary melt processing methods, such as extrusion molding, injection molding, and compression molding. For this reason, PAS has been widely used in a wide range of technical fields such as electric devices, electronic devices, devices for automobiles, and packaging materials.

As a method for producing such PAS, for example, Patent Document 1 proposes a method for producing glanular polyarylene sulfide, the method including:

step 1: a preparation step of preparing a mixture containing an organic amide solvent, a sulfur source, water, a dihalo aromatic compound, and an alkali metal hydroxide;

step 2: a pre-stage polymerization step of initiating a polymerization reaction by heating the mixture to produce a prepolymer having a dihalo aromatic compound conversion rate of not less than 50% in the presence of less than an equimolar amount of an alkali metal hydroxide per 1 mol of the sulfur source;

step 3: a post-stage polymerization step of continuing the polymerization reaction in the presence of not less than an equimolar amount of an alkali metal hydroxide per 1 mol of the sulfur source to obtain a reaction product mixture; and step 4: a cooling step of cooling the reaction product mixture after the post-stage polymerization step;

in which step 4 is performed in the presence of at least one auxiliary agent selected from the group consisting of carboxylates, alkali metal chlorides, organic sulfonates, alkali metal sulfates, alkali earth metal oxides, alkali metal phosphates, and alkali earth metal phosphates.

CITATION LIST

Patent Document

Patent Document 1: JP 2017-179255 A

SUMMARY OF INVENTION

Technical Problem

However, according to the study by the present inventors, it has been found that it is difficult to produce PAS having a small particle size by the known production method disclosed in Patent Document 1 and the like, and since the PAS has a large particle size, productivity of the PAS may be deteriorated due to occurrence of clogging of pipes during a production process or difficulty in cleaning particles after polymerization.

On the other hand, if the particle size of the PAS is excessively small, an amount of PAS passing through a screen increases during sieving in a post-treatment step, which reduces an amount of PAS collected or causes clogging of the screen, and thus there is a problem that post-treatment efficiency is lowered.

In light of the above problems, an object of the present invention is to provide a method for producing PAS by which PAS having a small particle size of 50 μm or greater and 550 μm or less as an average particle size can be produced.

Solution to Problem

The present inventors found that the object is accomplished by a method for producing PAS, including: (1) a preparation step of preparing a prepared mixture containing an organic polar solvent, a sulfur source, and a dihalo aromatic compound; (2) a pre-stage polymerization step of initiating a polymerization reaction by heating the prepared mixture to produce a prepolymer; (3) a phase separation step of adding water as a phase separation agent to a reaction mixture in a reaction system to form a phase separation state; and (4) a post-stage polymerization step of continuing the polymerization reaction after the phase separation step, in which an organic sulfonic acid metal salt having a specific solubility in water is contained in the prepared mixture or the reaction mixture, and have achieved the present invention.

A method for producing PAS according to the present invention is a method for producing polyarylene sulfide including:

(1) a preparation step of preparing a prepared mixture containing an organic polar solvent, a sulfur source, and a dihalo aromatic compound;

(2) a pre-stage polymerization step of initiating a polymerization reaction by heating the prepared mixture to produce a prepolymer;

(3) a phase separation step of adding water as a phase separation agent to a reaction mixture in a reaction system to form a phase separation state; and (4) a post-stage polymerization step of continuing the polymerization reaction after the phase separation step, in which an organic sulfonic acid metal salt is contained in the prepared mixture or the reaction mixture before the post-stage polymerization step, the organic sulfonic acid metal salt is dissolved in an amount of 3 mol or greater per 1 kg of water at 23° C., and an average particle size of the polyarylene sulfide collected is 50 μm or greater and 550 μm or less.

In the method for producing PAS according to the present invention, an amount of the organic sulfonic acid metal salt used may be 25 mol % or less with respect to a number of moles of the sulfur source.

In the method for producing PAS according to the present invention, an amount of water added in the phase separation step may be from 0.1 to 5 mol per 1 mol of the sulfur source.

In the method for producing PAS according to the present invention, the organic sulfonic acid metal salt may be contained in the prepared mixture.

In the method for producing PAS according to the present invention, the organic sulfonic acid metal salt may be sodium methanesulfonate.

Advantageous Effects of Invention

According to the present invention, it is possible to provide a method for producing PAS by which PAS having a small particle size of 50 μm or greater and 550 μm or less as an average particle size can be produced.

DESCRIPTION OF EMBODIMENTS

An embodiment of the method for producing PAS according to the present invention is described hereinafter. The method for producing PAS in the present embodiment includes a preparation step, a polymerization step, a phase separation step, and a post-stage polymerization step as essential steps. As desired, the method for producing PAS in the present embodiment may include a water removal step, a cooling step, a post-treatment step, and other steps. Each of the materials used in an embodiment of the present invention is described in detail below, and each step is also described in detail below.

Organic Polar Solvent, Sulfur Source, and Dihalo Aromatic Compound

The organic polar solvent, the sulfur source, and the dihalo aromatic compound are not particularly limited, and those typically used in production of PAS can be used. The organic polar solvent, the sulfur source, and the dihalo aromatic compound may each be used alone, or may each be used by mixing two or more types as long as the combination can produce PAS having a desired chemical structure.

Examples of the organic polar solvent include organic amide solvents; aprotic organic polar solvents formed from organosulfur compounds; and aprotic organic polar solvents formed from cyclic organophosphorus compounds. Examples of the organic amide solvent include amide compounds, such as N,N-dimethylformamide and N,N-dimethylacetamide; N-alkylcaprolactam compounds, such as N-methyl-ε-caprolactam, N-alkylpyrrolidone compounds or N-cycloalkylpyrrolidone compounds, such as N-methyl-2-pyrrolidone (hereinafter, also referred to as "NMP") and N-cyclohexyl-2-pyrrolidone; N,N-dialkylimidazolidinone compounds, such as 1,3-dialkyl-2-imidazolidinone; tetraalkyl urea compounds, such as tetramethyl urea; and hexaalkylphosphorus triamide compounds, such as hexamethylphosphorus triamide. Examples of the aprotic organic polar solvent formed from an organosulfur compound include dimethyl sulfoxide and diphenyl sulfone. Examples of the aprotic organic polar solvent formed from a cyclic organophosphorus compound include 1-methyl-1-oxophosphorane. Among them, from the viewpoint of availability, handleability, and the like, an organic amide solvent is preferable, an N-alkylpyrrolidone compound, an N-cycloalkylpyrrolidone compound, an N-alkylcaprolactam compound, and an N,N-dialkylimidazolidinone compound are more preferable, NMP, N-methyl-ε-caprolactam, and 1,3-dialkyl-2-imidazolidinone are still more preferable, and NMP is particularly preferable.

The amount of the organic polar solvent used is preferably from 1 to 30 mol, and more preferably from 3 to 15 mol, with respect to 1 mol of the sulfur source from the perspective of, for example, efficiency of the polymerization reaction.

Examples of the sulfur source include alkali metal sulfides, alkali metal hydrosulfides, and hydrogen sulfide, and alkali metal sulfides and alkali metal hydrosulfides are preferred. The sulfur source can be handled, for example, in a state of any one of aqueous slurry or aqueous solution, and is preferably in a state of an aqueous solution from the perspective of handling such as measurability and transportability. Examples of the alkali metal sulfides include lithium sulfide, sodium sulfide, potassium sulfide, rubidium sulfide, and cesium sulfide. Examples of the alkali metal hydrosulfides include lithium hydrosulfide, sodium hydrosulfide, potassium hydrosulfide, rubidium hydrosulfide, and cesium hydrosulfide.

The dihalo aromatic compound refers to an aromatic compound in which two hydrogen atoms bonded directly to an aromatic ring are substituted with a halogen atom.

Examples of the dihalo aromatic compound include dihalo aromatic compounds such as o-dihalobenzene, m-dihalobenzene, p-dihalobenzene, dihalotoluene, dihalonaphthalene, methoxy-dihalobenzene, dihalobiphenyl, dihalobenzoic acid, dihalodiphenyl ether, dihalodiphenyl sulfone, dihalodiphenyl sulfoxide, and dihalodiphenyl ketone. The halogen atom refers to each atom of fluorine, chlorine, bromine, or iodine, and the two or more halogen atoms in the dihalo aromatic compound may be the same or different. Among these, from the viewpoints of availability, reactivity, and the like, the dihalo aromatic compound is preferably a p-dihalobenzene, a m-dihalobenzene, and a mixture of both, more preferably a p-dihalobenzene, and particularly preferably a p-dichlorobenzene (hereinafter also referred to as "pDCB").

The amount of the dihalo aromatic compound used is preferably from 0.90 to 1.50 mol, more preferably from 0.92 to 1.10 mol, and still more preferably from 0.95 to 1.05 mol, with respect to 1 mol of the amount of the sulfur source charged. When the used amount is in the range described above, decomposition reactions are less likely to occur, a stable polymerization reaction can be easily performed, and a high molecular weight polymer tends to be produced.

Organic Sulfonic Acid Metal Salt

In the method for producing PAS, an organic sulfonic acid metal salt is contained in a prepared mixture or a reaction mixture before a post-stage polymerization step.

As the organic sulfonic acid metal salt, an organic sulfonic acid metal salt dissolved in an amount of 3 mol or greater per 1 kg of water at 23° C. is used. From the viewpoint of easiness of obtaining a desired effect, the organic sulfonic acid metal salt is desirably a compound having a substituent with a small number of carbon atoms and high polarity. The organic sulfonic acid metal salt is dissolved in an amount of preferably 3.5 mol or greater, more preferably 4 mol or greater, per 1 kg of water at 23° C.

When the organic sulfonic acid metal salt having high water solubility is contained in the prepared mixture or the reaction mixture before the post-stage polymerization step, the organic sulfonic acid metal salt is distributed to a dilute phase in a reaction solution in a phase separation state formed through a phase separation agent addition step of adding water, which is essential, to the reaction mixture and including a dense phase mainly composed of high molecular weight PAS and a dilute phase mainly composed of an organic polar solvent, water, and low molecular weight PAS. As a result, it is considered that salting out occurs in the dilute phase and the low molecular weight PAS is precipitated. The precipitated low molecular weight PAS is eluted into the dense phase. As a result, it is considered that a viscosity of a dense layer is added, droplets of the dense phase dispersed in the reaction mixture are refined, and PAS having a small particle size is obtained.

A metal cation constituting the organic sulfonic acid metal salt is not particularly limited as long as the organic sulfonic acid metal salt has the above-mentioned predetermined solubility in water. Examples of the metal cation include alkali metal ions such as a sodium ion, a potassium ion, and a lithium ion, and alkaline earth metal ions of calcium and magnesium.

The number of sulfonic acid metal bases contained in one molecule of the organic sulfonic acid metal salt is not particularly limited. The number of sulfonic acid metal bases contained in one molecule of the organic sulfonic acid metal salt is typically 1 or greater and 4 or less, preferably 1 or 2, and more preferably 1.

The organic sulfonic acid metal salt may have a substituent other than the sulfonic acid metal base as long as the object of the present invention is not impaired. Examples of the substituent include an alkoxy group having 1 or more and 6 or less carbon atoms, an aliphatic acyl group having 2 or more and 6 or less carbon atoms, and a benzoyl group.

The number of substituents other than the sulfonic acid metal base contained in the organic sulfonic acid metal salt is not particularly limited as long as the object of the present invention is not impaired. When an organic sulfonic acid metal base has a substituent other than the sulfonic acid metal base, the number of substituents is preferably 1 or greater and 4 or less, more preferably 1 or 2, and particularly preferably 1.

From the viewpoint of good solubility in water, the organic sulfonate anion constituting the organic sulfonic acid metal salt is preferably a hydrocarbyl sulfonate anion having no substituent described above, more preferably an alkane sulfonate anion, still more preferably an alkane sulfonate anion having 1 or more and 4 or less carbon atoms, and particularly preferably a methane sulfonate anion.

As a specific example of the organic sulfonic acid metal salt, sodium methanesulfonate is preferable because it is excellent in solubility in water, has a small molecular weight, easily obtains a desired effect even when used in a small amount, and is easily available.

The amount of the organic sulfonic acid metal salt to be used is not particularly limited as long as a desired effect can be obtained. From the viewpoint of easiness of obtaining a desired effect, the amount of the organic sulfonic acid metal salt used is preferably 40 mol % or less, more preferably 30 mol % or less, still more preferably 25 mol % or less, particularly preferably 20 mol % or less, and most preferably 15 mol % or less with respect to the number of moles of the sulfur source. Furthermore, from the viewpoint of easiness of obtaining a desired effect, the amount of the organic sulfonic acid metal salt used is preferably 3 mol % or greater, more preferably 5 mol % or greater, still more preferably 7 mol % or greater, particularly preferably 8 mol % or greater, and most preferably 10 mol % or greater, with respect to the number of moles of the sulfur source.

From the viewpoint of the effect of accelerating the polymerization reaction in a pre-stage polymerization step and the post-stage polymerization step, the amount of the organic sulfonic acid metal salt used is preferably 7 mol % or greater, more preferably 8 mol % or greater, and still more preferably 10 mol % or greater, with respect to the number of moles of the sulfur source. From the viewpoint of achieving both a good yield of PAS and a decrease in particle size of PAS obtained within a suitable range, the amount of the organic sulfonic acid metal salt used is preferably 7 mol % or greater and 25 mol % or less, and more preferably 8 mol % or greater and 20 mol % or greater, with respect to the number of moles of the sulfur source.

Water Removal Step

The water removal step is a step of discharging at least a part of a distillate containing water from the inside of a system containing a mixture containing the organic polar solvent and the sulfur source to the outside of the system before the preparation step. The mixture subjected to the water removal step may contain an alkali metal hydroxide as necessary. The polymerization reaction of the sulfur source and the dihalo aromatic compound is affected, e.g. promoted or inhibited, by the amount of water present in the polymerization reaction system. Therefore, the water content of the polymerization reaction system is preferably reduced by performing the water removal treatment before the polymerization so that the water content does not inhibit the polymerization reaction.

The foregoing organic sulfonic acid metal salt may be added to the mixture subjected to the water removal step. An organic sulfonic acid and a basic metal-containing compound or the like may be added to the mixture to produce an organic sulfonic acid metal salt in the mixture. Examples of the basic metal-containing compound include alkali metal hydroxides such as sodium hydroxide and potassium hydroxide, and alkali metal carbonates such as sodium carbonate and potassium carbonate.

Note that, with no limitation to the water removal step, the organic sulfonic acid metal salt may be produced by reaction between the organic sulfonic acid and the basic metal-containing compound or the like in any step before the post-stage polymerization step.

Since water introduced into the mixture together with the organic sulfonic acid metal salt and water produced as a by-product by the reaction between the organic sulfonic acid and the basic metal-containing compound or the like can be removed, it is preferable that the organic sulfonic acid metal salt is added to the mixture, subjected to the water removal step, in an amount of preferably 50 mass % or greater, more preferably 80 mass % or greater, still more preferably 90 mass % or greater, and particularly preferably 100 mass % with respect to the total amount of the organic sulfonic acid used in the method for producing PAS, or the organic sulfonic acid metal salt is produced in the mixture subjected to the water removal step.

In the water removal step, the water removal is preferably performed by heating in an inert gas atmosphere. Water to be removed in the water removal step includes water contained in the raw materials charged in the water removal step, an aqueous medium of the aqueous mixture, and water produced as a by-product by the reaction between the raw materials.

The heating temperature in the water removal step is not particularly limited as long as the heating temperature is 300° C. or less but is preferably from 100 to 250° C. The heating time is preferably from 15 minutes to 24 hours, and more preferably from 30 minutes to 10 hours.

In the water removal step, the water removal is performed until the water content reaches a predetermined range. That is, in the water removal step, it is desirable to remove water until the water content in the prepared mixture (described later) reaches preferably from 0.5 to 2.4 mol with respect to 1.0 mol of the sulfur source (hereinafter, also referred to as a "charged sulfur source" or an "effective sulfur source"). When the water content is excessively small in the water removal step, water may be added to adjust the water content to a desired water content in the preparation step prior to the pre-stage polymerization step.

Preparation Step

The preparation step is a step by which a mixture containing an organic polar solvent, a sulfur source, and a dihalo aromatic compound is prepared. The mixture prepared in the preparation step is also referred to as "prepared mixture".

In the method for producing PAS, an organic sulfonic acid metal salt is contained in a prepared mixture or a reaction mixture before a post-stage polymerization step. Thus, in the preparation step, the organic sulfonic acid metal salt may be added to the prepared mixture.

In the case where the water removal step is performed, the amount of the sulfur source in the prepared mixture (hereinafter, also referred to as "amount of charged sulfur source" or "amount of effective sulfur source") can be calculated by subtracting the molar quantity of the hydrogen sulfide volatilized in the water removal step from the molar quantity of the sulfur source charged as the raw material.

In the case where the water removal step is performed, as necessary, in the preparation step, an alkali metal hydroxide and water can be added to the mixture remaining in the system after the water removal step. In particular, the alkali metal hydroxide can be added taking into account the amount of hydrogen sulfide produced during the water removal and the amount of the alkali metal hydroxide produced during the water removal. As the alkali metal hydroxide, those usually used in the production of PAS can be used. The alkali metal hydroxides may be used alone, or two or more types thereof may be used in mixture as long as the combination can produce PAS. Examples of the alkali metal hydroxide include lithium hydroxide, sodium hydroxide, potassium hydroxide, rubidium hydroxide, and cesium hydroxide. The number of moles of the alkali metal hydroxide is calculated based on the number of moles of the alkali metal hydroxide added as necessary in the preparation step, and when the water removal step is performed, the number of moles of the alkali metal hydroxide is calculated based on the number of moles of the alkali metal hydroxide added as necessary in the water removal step and the number of moles of the alkali metal hydroxide produced along with hydrogen sulfide in the water removal step. When the sulfur source contains an alkali metal sulfide, the number of moles of the alkali metal hydroxide per 1 mol of the sulfur source (charged sulfur source) is calculated in a manner that the number of moles of the alkali metal sulfide is included. When the sulfur source contains hydrogen sulfide, the number of moles of the alkali metal hydroxide per 1 mol of the sulfur source (charged sulfur source) is calculated in a manner that the number of moles of the produced alkali metal sulfide is included. However, the number of moles of the alkali metal hydroxide added for other purposes, such as the number of moles of the alkali metal hydroxide consumed in a reaction such as neutralization when an organic carboxylic acid metal salt is used as a phase separation agent in a form of a combination of an organic carboxylic acid and the alkali metal hydroxide, is not included in the number of moles of the alkali metal hydroxide per 1 mol of the sulfur source (charged sulfur source). Furthermore, when at least one acid selected from the group consisting of inorganic acids and organic acids is used for some reason or the like, the number of moles of the alkali metal hydroxide required to neutralize the at least one acid is not included in the number of moles of the alkali metal hydroxide per 1 mol of the sulfur source (charged sulfur source).

In the prepared mixture, the amount of each of the organic polar solvent and the dihalo aromatic compound used is set to, for example, the range shown in the above description related to the organic polar solvent and the dihalo aromatic compound with respect to 1 mol of the amount of the sulfur source charged. When the total amount of the organic sulfonic acid metal salt is added to the prepared mixture in the preparation step, the organic sulfonic acid metal salt is used, for example, in an amount within the aforementioned range.

The organic sulfonic acid metal salt is preferably added to the prepared mixture before the pre-stage polymerization step described below. By adding the organic sulfonic acid metal salt to the prepared mixture before the pre-stage polymerization step, the polymerization reaction in the pre-stage polymerization step and the post-stage polymerization step described below is promoted, and high molecular weight PAS is easily obtained.

When the organic sulfonic acid metal salt is partially added to the prepared mixture in the preparation step, the amount of the organic sulfonic acid metal salt added to the prepared mixture in the preparation step is preferably 5 mass % or greater and 95 mass % or less, and more preferably 50 mass % or greater and 90 mass % or less with respect to the total mass of the organic sulfonic acid metal salt.

From the viewpoint of promoting the polymerization reaction in the pre-stage polymerization step and the post-stage polymerization step described below, the sum of the amount of the organic sulfonic acid metal salt added in the water removal step and the amount of the organic sulfonic acid metal salt added in the preparation step is preferably 7 mol % or greater, more preferably 8 mol % or greater, and still more preferably 10 mol % or greater with respect to the number of moles of the sulfur source.

Pre-Stage Polymerization Step, Phase Separation Agent Addition Step, and Post-Stage Polymerization Step The pre-stage polymerization step is a step of initiating polymerization reaction of the prepared mixture to produce a prepolymer. In the pre-stage polymerization step, the sulfur source and the dihalo aromatic compound are polymerized in the organic polar solvent to produce a prepolymer of PAS. The organic sulfonic acid metal salt is contained in the prepared mixture or the reaction mixture before the post-stage polymerization step, and thus PAS having a small particle size can be produced in a high yield. The mixture heated in the pre-stage polymerization step and the post-stage polymerization step and the mixture in which the phase separation agent is added in the phase separation agent addition step and the mixture that is phase-separated in the phase separation agent addition step are referred to as the "reaction mixture".

To obtain higher molecular weight PAS, the polymerization reaction can be performed in two or more separate stages. Specifically, the pre-stage polymerization step described above and the post-stage polymerization step in which the polymerization reaction is continued in the presence of a phase separation agent are performed. The phase separation agent is added to the reaction mixture in the phase separation agent addition step provided between the pre-stage polymerization step and the post-stage polymerization step.

For example, Example II of U.S. Pat. No. 4,038,260 B discloses a method for producing PAS in which a mixture consisting of sodium sulfide, sodium hydroxide, sodium benzenesulfonate, and NMP is dehydrated, and then p-dichlorobenzene is added to the dehydrated mixture to perform a polymerization reaction in one step. However, in such a method, powdery PAS having an excessively small particle size is produced, and granular PAS having an average particle size of 50 μm or greater and 550 μm or less, which is a small particle size within a suitable range, cannot be obtained.

On the other hand, as described above, in the method including the pre-stage polymerization step, the phase separation agent addition step, and the post-stage polymerization step, the organic sulfonic acid metal salt is added to the reaction mixture at a predetermined timing to perform the polymerization reaction, whereby granular PAS having a reduced particle size within a suitable range, which is easy to handle, can be obtained.

As described above, the organic sulfonic acid metal salt is added to the prepared mixture or the reaction mixture before the post-stage polymerization step. Thus, in the pre-stage polymerization step and/or the phase separation agent addition step, the organic sulfonic acid metal salt can be added to the reaction mixture.

In the pre-stage polymerization step or the phase separation agent addition step, when the total amount of the organic sulfonic acid metal salt is added to the prepared mixture, the organic sulfonic acid metal salt is used, for example, in an amount within the aforementioned range.

In the pre-stage polymerization step and the phase separation agent addition step, when the total amount of the organic sulfonic acid metal salt is divided and added to the reaction mixture, a ratio between the amount of the organic sulfonic acid metal salt added in the pre-stage polymerization step and the amount of the organic sulfonic acid metal salt added in the phase separation agent addition step is not particularly limited.

When the organic sulfonic acid metal salt is partially added to the prepared mixture before the pre-stage polymerization step, a remaining amount in the used amount of the organic sulfonic acid metal salt promotes the polymerization reaction in the pre-stage polymerization step and/or the post-stage polymerization step, and high molecular weight PAS is easily obtained.

In the pre-stage polymerization step, a conversion rate of the dihalo aromatic compound is preferably from 50 to 98 mol %, more preferably from 60 to 97 mol %, still more preferably from 65 to 96 mol %, and particularly preferably from 70 to 95 mol %. The conversion rate of the dihalo aromatic compound can be calculated by determining the amount of the dihalo aromatic compound remaining in the reaction mixture by gas chromatography and then performing a calculation based on the remaining amount of the dihalo aromatic compound, the amount of the dihalo aromatic compound charged, and the amount of the sulfur source charged.

In the post-stage polymerization step following the pre-stage polymerization step, a degree of polymerization of the prepolymer increases.

As the phase separation agent, water is necessarily added. In the phase separation agent addition step, a phase separation agent other than water can be used together with water. When water and the phase separation agent other than water are used in combination, the phase separation agent other than water is not particularly limited. Examples of the phase separation agent other than water include at least one selected from the group consisting of organic carboxylic acid metal salts (for example, an alkali metal salt of an aliphatic carboxylic acid, such as sodium acetate, an alkaline earth metal salt of an aromatic carboxylic acid, and the like), organic sulfonic acid metal salts, alkali metal halides, alkaline earth metal halides, alkali metal phosphates, alcohols, and nonpolar solvents. The salts used as the phase separation agent may each be in a form obtained by separately adding corresponding acid and base.

The amount of the phase separation agent used varies depending on the type of compounds used but may be in a range of from 0.01 to 20 mol with respect to 1 kg of the organic polar solvent. The amount of water used as the phase separation agent is preferably from 0.1 to 5 mol, and more preferably from 2 to 4 mol per 1 mol of the sulfur source, from the viewpoint of easily and highly dissolving the organic sulfonic acid. The water content in the reaction system when water is added as the phase separation agent may be more than 4 mol and 20 mol or less, from 4.1 to 14 mol, or from 4.2 to 10 mol per 1 kg of the organic polar solvent.

In the post-stage polymerization step, the amount of the alkali metal hydroxide is preferably from 1.00 to 1.10 mol, more preferably from 1.01 to 1.08 mol, and still more preferably from 1.02 to 1.07 mol, with respect to 1 mol of the sulfur source. When the amount of the alkali metal hydroxide is within the above range, the molecular weight of PAS obtained is more likely to increase, and higher molecular weight PAS is more likely to be obtained. In the post-stage polymerization step, the alkali metal hydroxide is preferably added to the reaction mixture based on the amount of the alkali metal hydroxide present in the reaction mixture after the pre-stage polymerization step, so that a final amount of the alkali metal hydroxide is within the above range.

In the pre-stage polymerization step and the post-stage polymerization step, the polymerization reaction is preferably performed under heating at a temperature of from 170 to 300° C. from the viewpoint of efficiency of the polymerization reaction and the like. The polymerization temperature in the pre-stage polymerization step and the post-stage polymerization step is more preferably in a range of from 180 to 280° C. in order to suppress side reactions and decomposition reactions. In particular, in the pre-stage polymerization step, from the viewpoint of the efficiency of the polymerization reaction and the like, it is preferable to initiate the polymerization reaction under heating at a temperature of from 170 to 270° C. to produce a prepolymer having a conversion rate of the dihalo aromatic compound of 50% mol or greater. The polymerization temperature in the pre-stage polymerization step is preferably selected from a range of from 180 to 265° C. in order to suppress side reactions and decomposition reactions.

The polymerization reaction in the pre-stage polymerization step and the post-stage polymerization step may be carried out batch-wise or continuously. For example, the polymerization reaction can be continuously performed by simultaneously performing in parallel at least the supply of the organic polar solvent, the sulfur source, and the dihalo aromatic compound, the production of PAS by the reaction of the sulfur source and the dihalo aromatic compound in the organic polar solvent, and the collection of the reaction mixture containing PAS.

Cooling Step

The cooling step is a step of cooling the reaction mixture after the polymerization step. Specific operations in the cooling step are as described in JP 6062924 B, for example.

Post-Treatment Steps (Such as Separation Step, Washing Step, Collection Step)

In the method for producing PAS according to the present embodiment, the post-treatment steps after the polymerization reaction can be performed by common methods, such as the method described in JP 2016-056232 A.

Obtained PAS

PAS obtained by the method for producing PAS in the present embodiment has a small average particle size. More specifically, the average particle size of PAS obtained by the above-described method for producing PAS can be preferably 550 μm or less, more preferably 500 μm or less, still more preferably 450 μm or less, and even more preferably 400 μm or less. The lower limit of the average particle size of PAS is not particularly limited, and typically, may be 50 μm or greater, or 100 μm or greater. That is, the average particle size of PAS collected from a reaction solution after the post-stage polymerization is preferably 50 μm or greater and 550 μm or less.

The average particle size of PAS is measured with a screening method using a sieve having a mesh size of 2,800

μm (7 mesh (mesh count/inch)), a sieve having a mesh size of 1,410 μm (12 mesh (mesh count/inch)), a sieve having a mesh size of 1,000 μm (16 mesh (mesh count/inch)), a sieve having a mesh size of 710 μm (24 mesh (mesh count/inch)), a sieve having a mesh size of 500 μm (32 mesh (mesh count/inch)), a sieve having a mesh size of 250 μm (60 mesh (mesh count/inch)), a sieve having a mesh size of 150 μm (100 mesh (mesh count/inch)), a sieve having a mesh size of 105 μm (145 mesh (mesh count/inch)), a sieve having a mesh size of 75 μm (200 mesh (mesh count/inch)), and a sieve having a mesh size of 38 μm (400 mesh (mesh count/inch)) as a sieve used, and calculated as the average particle size when the cumulative mass reaches 50 mass % from the mass of the oversize fraction of each sieve.

The average molecular weight of PAS obtained is not particularly limited as long as the object of the present invention is not impaired. The average molecular weight is preferably 35000 or greater, more preferably 38000 or greater, still more preferably 40000 or greater, even more preferably 41000 or greater, and particularly preferably 42000 or greater as a weight average molecular weight. When the weight average molecular weight is 35000 or greater, toughness of PAS tends to be high. The upper limit of the weight average molecular weight is not particularly limited, and may be 100000 or less, 80000 or less, or 70000 or less. In the present specification, the weight average molecular weight refers to a weight average molecular weight measured by gel permeation chromatography and calibrated with polystyrene.

The yield of PAS is preferably 87% or greater, more preferably 90% or greater, and still more preferably 92% or greater.

PAS obtained by the method for producing PAS of the present embodiment can be formed into various injection molded products, or extrusion molded products such as sheets, films, fibers, and pipes, as is or after undergoing oxidative crosslinking, alone or by blending it with various inorganic fillers, fibrous fillers, and various synthetic resins, as desired.

In the method for producing PAS of the present embodiment, PAS is not particularly limited and is preferably PPS.

The present invention is not limited to the embodiments described above, and various modifications are possible within the scope indicated in the claims. Embodiments obtained by appropriately combining the technical means disclosed by the embodiments are also included in the technical scope of the present invention. In addition, all of the documents described in the present specification are herein incorporated by reference.

EXAMPLES

The present invention will be more specifically described hereinafter with reference to examples and comparative examples. Note that the present invention is not limited to these examples. The method of measuring the average particle size and the weight average molecular weight of PPS described below is as described above.

Example 1

Water Removal Step

In a 20 liter autoclave, 5,998 g of NMP, 2,003 g of an aqueous sodium hydrosulfide solution (NaSH; purity: 62.20 mass %), 1,072 g of sodium hydroxide (NaOH, purity: 73.22 mass %), and 258 g of sodium methanesulfonate were charged. After the inside of the autoclave was purged with nitrogen gas, the temperature was gradually raised to 200° C. while stirring with a stirrer at a revolution speed of 250 rpm over about 4 hours, and 895 g of water ($H_2O$), 805 g of NMP, and 15 g of hydrogen sulfide ($H_2S$) were distilled out.

Preparation Step

After the water removal step, the content of the autoclave was cooled to 150° C., and 3,235 g of pDCB, 3,328 g of NMP, 8 g of sodium hydroxide, and 93 g of water were added into the autoclave to prepare a mixture to be subjected to a first polymerization step.

Pre-Stage Polymerization Step

The temperature of the mixture prepared in the preparation step was raised from 220° C. to 260° C. over 1.5 hours while stirring the mixture, and the first polymerization step was performed. The ratio (g/mol) of NMP/charged sulfur source (hereinafter abbreviated as the "charged S") in the autoclave was 391, pDCB/charged S (mol/mol) was 1.010, and $H_2O$/charged S (mol/mol) was 1.50. The conversion rate of pDCB during the first polymerization step was 92%.

Phase Separation Agent Addition Step

After completion of the first polymerization step, the revolution speed of the stirrer was increased to 400 rpm, and 444 g of ion-exchanged water and 58 g of sodium hydroxide were injected while the content of the autoclave was stirred. $H_2O$/S (mol/mol) was 2.63.

Post-Stage Polymerization Step

After the ion-exchanged water was injected, the temperature was raised to 265° C., and the reaction was conducted for 2.5 hours to perform a second polymerization step.

Cooling Step

After completion of the polymerization, cooling was started and performed from 265° C. to 230° C. over 60 minutes, and then cooling was rapidly performed until the temperature reached room temperature.

Post-Treatment Step

The content of the autoclave was sieved with a screen having an opening diameter of 150 μm (100 mesh), washed with acetone and ion-exchanged water, then washed with an aqueous acetic acid solution, washed again with ion-exchanged water, and then dried at 120° C. for 4 hours to obtain granular PPS. The yield of the obtained PPS was 92.7%, the weight average molecular weight (Mw) was 62,700, and the average particle size was 360 μm.

Example 2

Granular PPS was obtained in the same manner as in Example 1 except that the amount of the organic sulfonic acid metal salt used was changed to the amount shown in Table 1. The yield of the obtained PPS was 86.2%, the weight average molecular weight (Mw) was 56,600, and the average particle size was 384 μm.

Example 3

Granular PPS was obtained in the same manner as in Example 1 except that the amount of the organic sulfonic acid metal salt used was changed to the amount shown in Table 1. The yield of the obtained PPS was 94.7%, the weight average molecular weight (Mw) was 69,500, and the average particle size was 520 μm.

Comparative Example 1

Granular PPS was obtained in the same manner as in Example 1 except that the organic sulfonic acid metal salt was not added. The yield of the obtained PPS was 80.8%, the weight average molecular weight (Mw) was 47,700, and the average particle size was 740 μm.

Comparative Example 2

Granular PPS was obtained in the same manner as in Example 1 except that the organic sulfonic acid metal salt was changed to sodium acetate. The yield of the obtained PPS was 87.7%, the weight average molecular weight (Mw) was 62,100, and the average particle size was 2810 μm.

Comparative Example 3

Granular PPS was obtained in the same manner as in Example 1 except that the organic sulfonic acid metal salt was changed from sodium methanesulfonate to sodium p-toluenesulfonate acetic acid. The yield of the obtained PPS was 91.3%, the weight average molecular weight (Mw) was 61,200, and the average particle size was 1530 μm.

Comparative Example 4

Granular PPS was obtained in the same manner as in Example 1 except that the organic sulfonic acid metal salt was changed to sodium sulfanilate. The yield of the obtained PPS was 92.2%, the weight average molecular weight (Mw) was 61,200, and the average particle size was 650 μm.

TABLE 1

| | Additive | | | | |
|---|---|---|---|---|---|
| | Type/amount dissolved (mol/kg (water) · 23° C.) | Amount added (mol %/the number of moles of sulfur source) | Yield (%) | Weight average molecular weight (Mw) | Average particle size (μm) |
| Example 1 | Na methanesulfonate/4.4 | 10 | 92.7 | 62700 | 360 |
| Example 2 | Na methanesulfonate/4.4 | 5 | 86.2 | 56600 | 384 |
| Example 3 | Na methanesulfonate/4.4 | 30 | 94.7 | 69500 | 520 |
| Comparative Example 1 | — | 0 | 80.8 | 47700 | 740 |
| Comparative Example 2 | Na acetate/4.2 | 10 | 87.7 | 62100 | 2810 |
| Comparative Example 3 | Na p-toluenesulfonate/2.8 | 10 | 91.3 | 61200 | 1530 |
| Comparative Example 4 | Na sulfanilate/1.2 | 10 | 92.2 | 61200 | 650 |

According to Example 1, it is found that when the organic sulfonic acid metal salt dissolved in an amount of 3 mol or greater per 1 kg of water at 23° C. is contained in the prepared mixture or the reaction mixture before the post-stage polymerization step, PAS having a small average particle size of 50 μm or greater and 550 μm or less as an average particle size can be produced in a high yield.

On the other hand, according to Comparative Examples 1 to 4, it is found that only PAS having a large average particle size can be produced when an organic sulfonic acid metal salt dissolved in an amount of less than 3 mol per 1 kg of water at 23° C. is used, or salts other than the organic sulfonic acid metal salt are used.

The invention claimed is:

1. A method for producing polyarylene sulfide comprising:
   (1) a preparation step of preparing a prepared mixture containing an organic polar solvent, a sulfur source, and a dihalo aromatic compound;
   (2) a pre-stage polymerization step of initiating a polymerization reaction by heating the prepared mixture to produce a prepolymer;
   (3) a phase separation step of adding water as a phase separation agent to a reaction mixture in a reaction system to form a phase separation state; and
   (4) a post-stage polymerization step of continuing the polymerization reaction after the phase separation step, wherein:
   an organic sulfonic acid metal salt is contained in the prepared mixture or the reaction mixture before the post-stage polymerization step,
   the organic sulfonic acid metal salt has a solubility of 3 mol or greater per 1 kg of water at 23° C., and
   an average particle size of produced polyarylene sulfide is 50 μm or greater and 550 μm or less.

2. The method for producing polyarylene sulfide according to claim 1, wherein an amount of the organic sulfonic acid metal salt used is 25 mol % or less with respect to a number of moles of the sulfur source.

3. The method for producing polyarylene sulfide according to claim 1, wherein an amount of the water added in the phase separation step is from 0.1 to 5 mol per 1 mol of the sulfur source.

4. The method for producing polyarylene sulfide according to claim 1, wherein the organic sulfonic acid metal salt is contained in the prepared mixture.

5. The method for producing polyarylene sulfide according to claim 1, wherein the organic sulfonic acid metal salt is sodium methanesulfonate.

\* \* \* \* \*